United States Patent [19]
Monroe

[11] Patent Number: 5,943,140
[45] Date of Patent: Aug. 24, 1999

[54] METHOD AND APPARATUS FOR SENDING AND RECEIVING FACSIMILE TRANSMISSIONS OVER A NON-TELEPHONIC TRANSMISSION SYSTEM

[76] Inventor: David Monroe, P.O. Box 780907, San Antonio, Tex. 78278-0907

[21] Appl. No.: 08/815,026

[22] Filed: Mar. 14, 1997

[51] Int. Cl.⁶ ..................................................... H04N 1/32
[52] U.S. Cl. ..................... 358/442; 358/400; 358/411; 358/440; 358/468; 358/476; 358/508
[58] Field of Search ..................... 358/442, 476, 358/508, 440, 468, 400, 411

[56] References Cited

U.S. PATENT DOCUMENTS

| | | | |
|---|---|---|---|
| 5,247,570 | 9/1993 | Bowen | 379/180 |
| 5,287,199 | 2/1994 | Zoccolillo | 358/402 |
| 5,291,302 | 3/1994 | Gordon et al. | 358/400 |
| 5,442,457 | 8/1995 | Najafi | 358/400 |
| 5,544,241 | 8/1996 | Dibner et al. | 379/373 |
| 5,696,600 | 12/1997 | Perkins | 358/442 |
| 5,729,595 | 3/1998 | Kugell et al. | 379/100.09 |
| 5,737,395 | 4/1998 | Irribarren | 379/88 |
| 5,751,442 | 5/1998 | Hamada et al. | 358/442 |

*Primary Examiner*—Leo H. Boudreau
*Assistant Examiner*—Kanji Patel
*Attorney, Agent, or Firm*—Bracewell & Patterson

[57] ABSTRACT

An interface is provided for connecting a standard telephone line and/or a standard facsimile machine with a distributive communication network interface such as a personal computer, whereby facsimile signal present on the telephone line or at the facsimile machine may be transmitted via the Internet to a remote station without the use of long distance or international telephone signal carriers. The facsimile signal may be sent or received via the network using the network, without interfering with the capability to receive and send facsimile signals in the normal manner via a standard telephone line.

9 Claims, 10 Drawing Sheets

METHOD AND APPARATUS FOR SENDING AND RECEIVING FACSIMILE TRANSMISSIONS OVER A NON-TELEPHONIC TRANSMISSION SYSTEM

BACKGROUND OF THE INVENTION

1. Field of the Invention

The subject invention is generally related to facsimile transmission of documents, commonly known as fax systems, and is specifically directed to a fax system for sending documents and printed materials via distributed communication networks such as, by way of example, the Internet.

2. Discussion of the Prior Art

Facsimile transmission of documents and printed matter is well known. In a typical application, the document is fed through a transmission machine, where the printed or graphic material on the hard document is converted into a digital signal. This signal is then transmitted in real time over a telephone line to a compatible receiving machine where it is decoded and a facsimile document is reproduced.

Over the years, numerous changes have been made in this basic concept to improve both the quality and the efficiency of the transmission. Most receiving units still record and encode the information on a line-by-line feed. Others store the entire document code prior to initiating transmission and store the entire received document prior to reproduction. Still other systems utilize memory capacity to permit storage of the documents during normal business hours for transmission during off hours. Comprehensive data compression and reduction schemes have been implemented in order to reduce the amount of data required to be transmitted and thus the transmission time.

All of these various improvements have been made to reduce the amount of on-line time and cost per transmission. Since transmission currently is almost always via public telephone lines, both congestion and expense are issues. This is particularly true when transmitting documents over domestic long distance lines or international telephone systems. Enormous savings could be achieved by a facsimile transmission system which is not dependent upon long distance and international public telephone lines.

SUMMARY OF THE INVENTION

The subject invention is directed to a facsimile transmission system which does not require the use of long distance or international telephone systems in order to transmit documents over long distances. Instead the "fax" system of the present invention utilizes the Internet, permitting fax transmission via local telephone service and Internet communication, or, in the alternative, directly over a network system without use of public access communication lines such as telephonic systems. The facsimile transmission system of the subject invention permits a standard Group III type fax machine to take advantage of hardwired or other distributive systems, with less noise and interference and at greater transmission speeds than standard telephone lines.

In the preferred embodiment, the fax system is also fully compatible with prior art systems and can send and receive documents via telephone lines as well as via other distributive communication networks such as, by way of example, the Internet. One significant advantage of the system of the subject invention is the ability to incorporate printed documents and graphic material, as well as computer generated documents and graphic material, into the fax system.

While the most significant advantage of the network fax system of the subject invention is the elimination of the use of costly public telephone carriers, the overall versatility of the system provides additional advantages over the prior art. For example, documents faxed into the system via prior art telephonic systems can be readily re-transmitted over the Internet. Likewise, documents transmitted over the Internet in the well known manner, e.g., E-mail, can be converted and retransmitted via prior art telephonic fax systems.

In addition, the network fax system of the subject invention can serve as an economical scanner, converting hard documents and graphic material into machine readable digital code which can then be transmitted directly into a computer based system for reformatting in a word processing system and the like. Likewise, the information in the computer system can be decoded and printed at the fax machine.

The versatility provided by the method and apparatus of the subject invention permits a common fax machine to become a printer and a scanner, as well as an interface to the distributive networks. This permits stations not on the network to communicate with the network via facsimile document transmission and permits the network users to communicate with the remote station.

All of this can be accomplished utilizing standard local telephone hookup between a user station and the network, permitting worldwide communication via a network such as the Internet without the use of long distance and international telephonic carriers.

The heart of the system of the subject invention is an interface positioned intermediately of a standard telephone line, a fax machine, and a computer. The interface may be an external or peripheral component or may be an integral part of either the personal computer or the fax machine or a modem. One desirable structure is to incorporate the interface into either an internal or external modem, replacing the single purpose modem of the prior art. It is also possible to make the system a stand alone fax machine with a controller for interconnecting the fax machine directly to the network without use of a computer. The interface is software supported at the computer and is adapted to route the signals through to the computer for storage or for transmission via a selected network, or over a standard telephonic line, both to and from a standard fax machine.

In the preferred embodiment, the interface is inserted between the fax machine, the P.C., and the standard telephone line. The system is also adapted for use with other communication links and devices such as by way of example, Ethernet, the World Wide Web and the like. The interface is also connected directly to a computer base such as a typical personal computer system, which permits communications between the network, the fax machine and the standard telephone system.

All of the software support for the system is loaded into the standard computer base. The interface permits the fax signal on the line between the public telephone system and the fax machine to be diverted to the computer where it is converted by the software into an acceptable Internet format. Signals from the Internet are converted into an acceptable fax format whereby they can be received by the local fax machine or transmitted over the standard telephone line to a remote fax system.

It is, therefore, an object and feature of the subject invention to provide a facsimile transmission system for permitting long distance fax transmission without the use of long distance or international telephone service.

It is a further object and feature of the subject invention to provide a facsimile transmission system that permits "faxed" documents to be transmitted and received via distributive data communication networks.

It is an additional object and feature of the subject invention to provide a facsimile transmission system which permits conversion of documents from any source into a computer into a standard facsimile format for transmission and reception via a standard facsimile transmission system.

Other objects and features of the invention will be readily apparent from the accompanying drawings and detailed description of the preferred embodiment.

DETAILED DESCRIPTION OF THE PREFERRED EMBODIMENT

Figure 1:
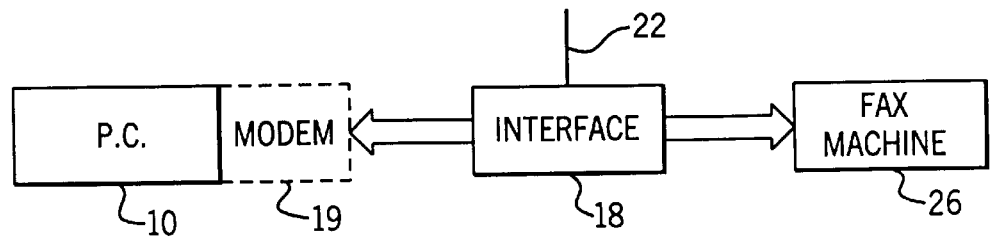
FIG. 1 is a block diagram showing the components of a system in accordance with the subject invention.

As shown in FIG. 1, the preferred embodiment of the invention incorporates an interface 18 between the modem 19 of a personal computer or PC 10 and a standard facsimile machine 26. The "universal" interface 18 may be an integral part of the facsimile machine 26, stand alone or an integral part of the computer hardware 10. In one embodiment, the interface 18 and the modem 19 are combined either as a stand alone unit or as integral component of the computer system. It is also possible to design a stand alone system incorporating an interface 18 with a modem 19 and a dedicated controller for connecting the facsimile machine directly to the network system without incorporating a computer workstation.

Figure 2:
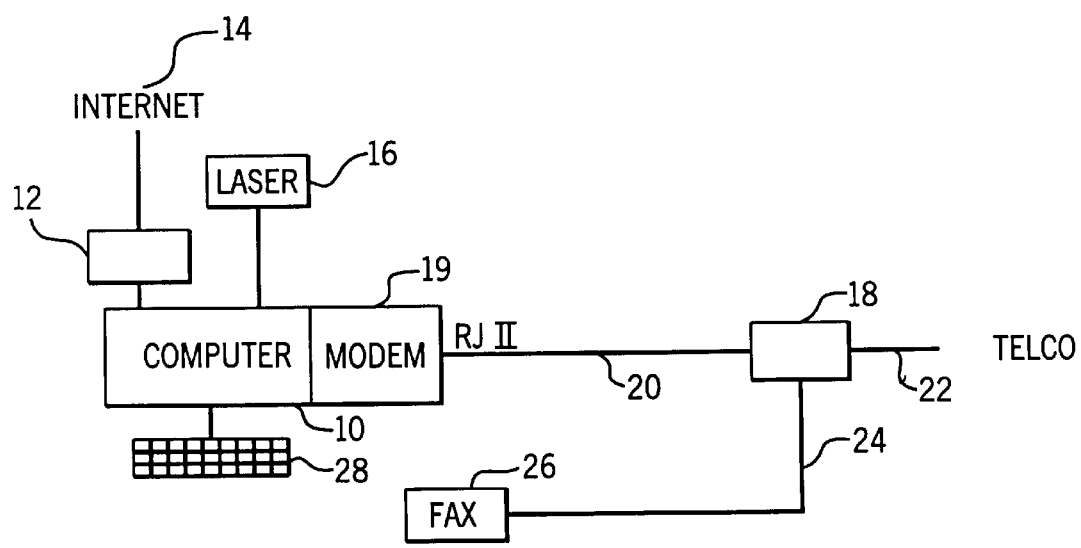
FIG. 2 is a flow diagram of a system incorporating the features of the subject invention.

In a typical configuration such as that shown in FIG. 2, the subject invention is utilized in combination with a standard computer based system such as, by way of example, the personal computer 10. As is typical, the computer 10 is connected to a modem 12, which may be either internal or external as shown. In a typical application, the modem may be used to connect the computer system to a distributive network such as the Internet, as indicated at 14. The network may also be wired directly into the computer, as is the case with LAN based systems and the like. The significant point is that the computer is adapted for communicating data over a distributive network system. Also as is typical, the computer system may include any of a plurality of options, desired peripheral hardware components such as, by way of example, the laser printer 16.

In the preferred embodiment, one of the serial/parallel ports of the computer is connected to the facsimile communication interface 18 of the subject invention via a dedicated cable 20. In the illustrated embodiment, the interface 18 is connected directly to a standard local service telephone line 22 and via a dedicated communication line 24 to a standard, off-the-shelf facsimile machine 26. The only additional hardware for the system of the subject invention is the interface 18, and the dedicated cable 20. A second phone wire 24 may also be required. The heart of the system is software which is loaded directly into the system via the computer 10, in typical fashion, utilizing a floppy disk or a CD ROM.

In order to operate the system of the subject invention, the software is utilized to convert the signal on line 20 received from the facsimile machine 26 from a standard facsimile signal such as, by way of example, a Group III signal, to a signal which is recognizable and useable by the computer system. Conversely, data signals output by the computer may be converted to Group III data signals, or the like for reproduction at the facsimile machine.

The data signal on line 20 may then be adapted for on-line transmission via the a distributive network such as the Internet 14 or for other computer based manipulation systems such as word processing and the like. The software also converts signals incoming directly to the computer via the Internet, a scanner (not shown), the keyboard 28, or other input device into a facsimile compatible signal for transmission over cable 20 and through the interface switch 18 to the fax machine 26 and/or the telephone line 27 as a fax signal.

Figure 3A:
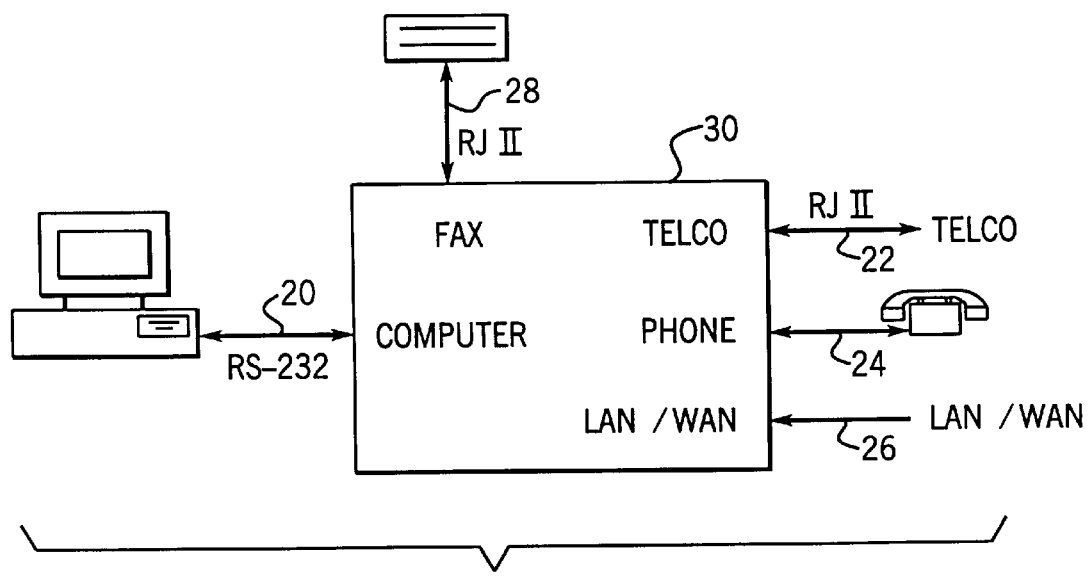
FIGS. 3A–3Q are diagrammatic illustrations of the activation combinations of the interface of the subject invention.
Figure 3B:
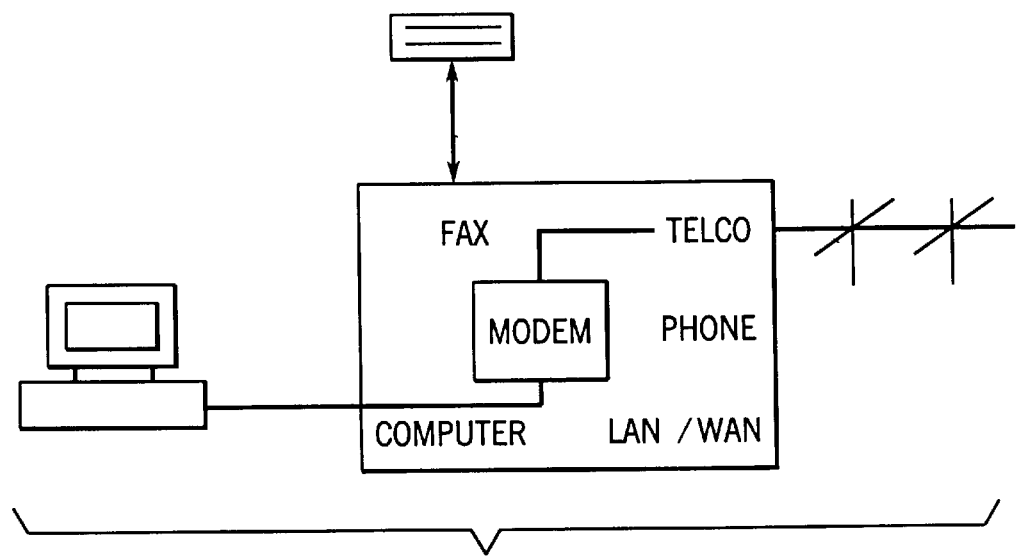
Figure 3C:
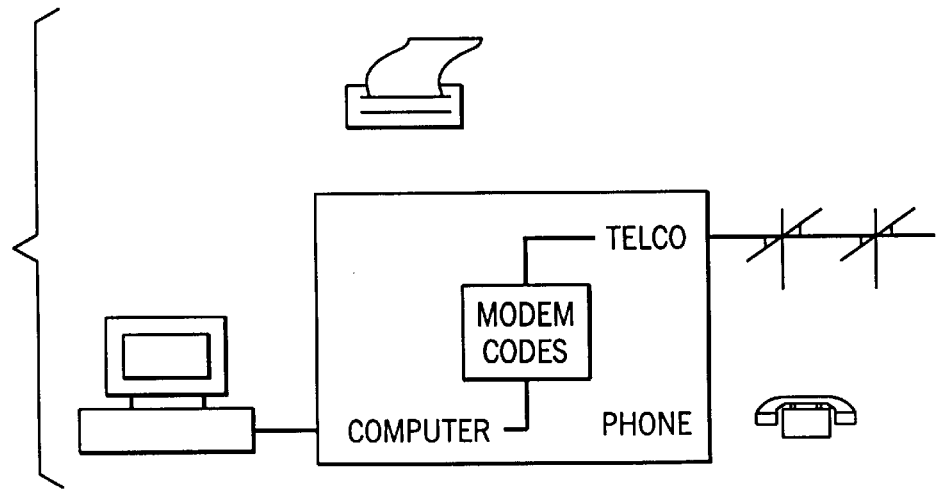
Figure 3D:
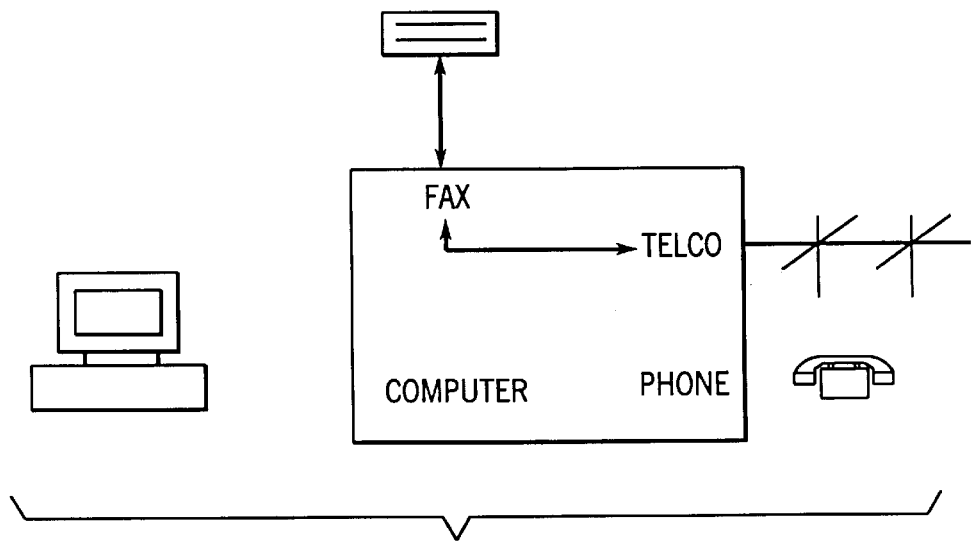
Figure 3E:
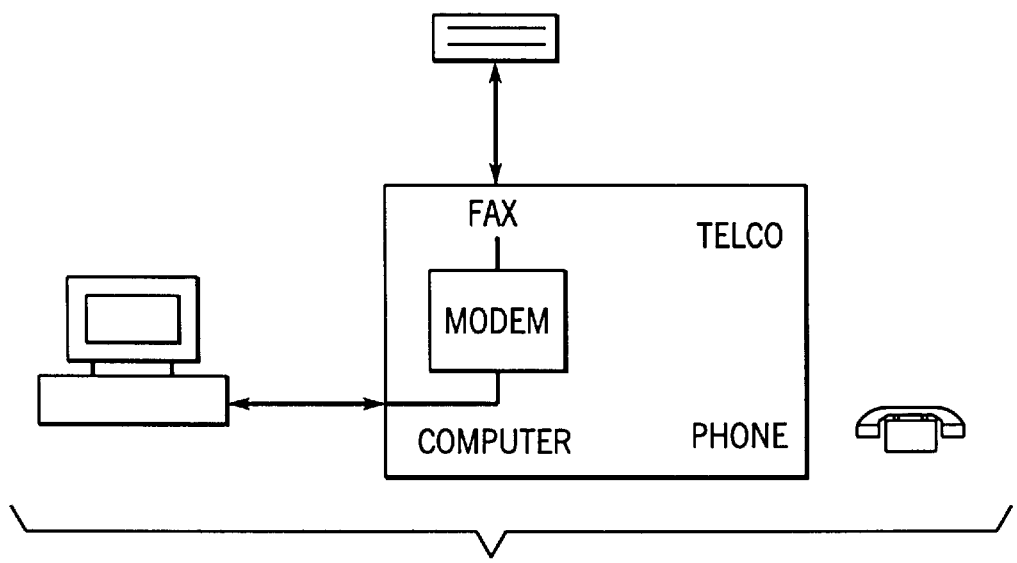
Figure 3F:
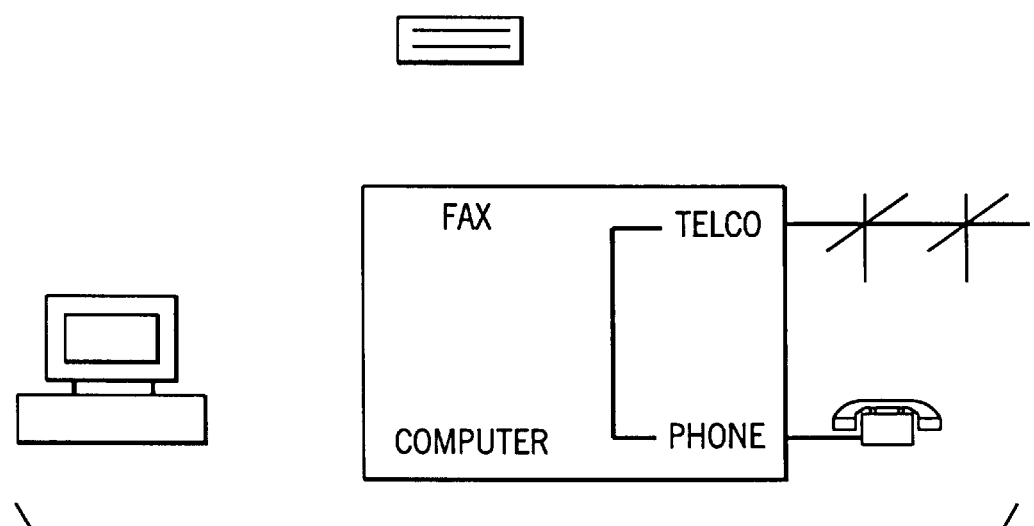
Figure 3G:
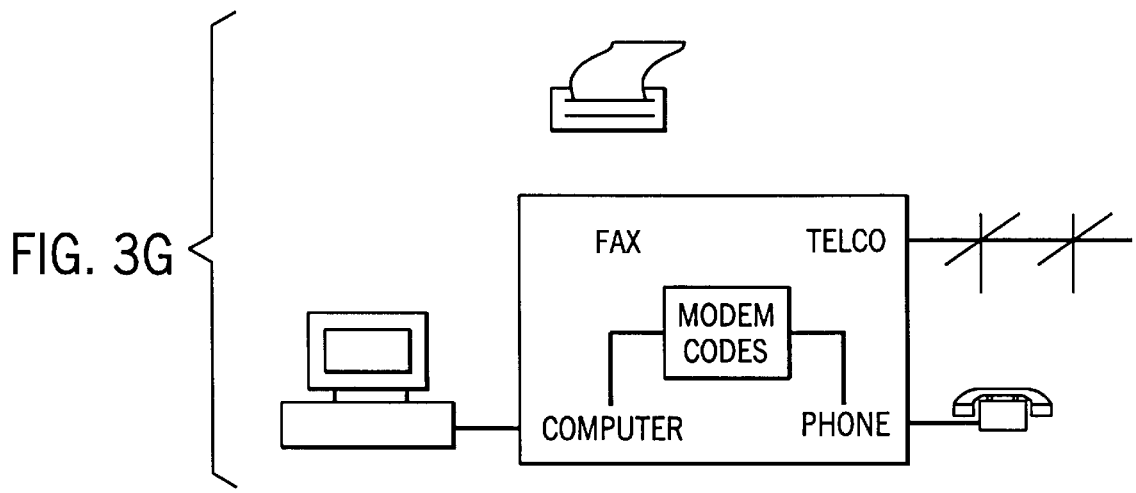
Figure 3H:
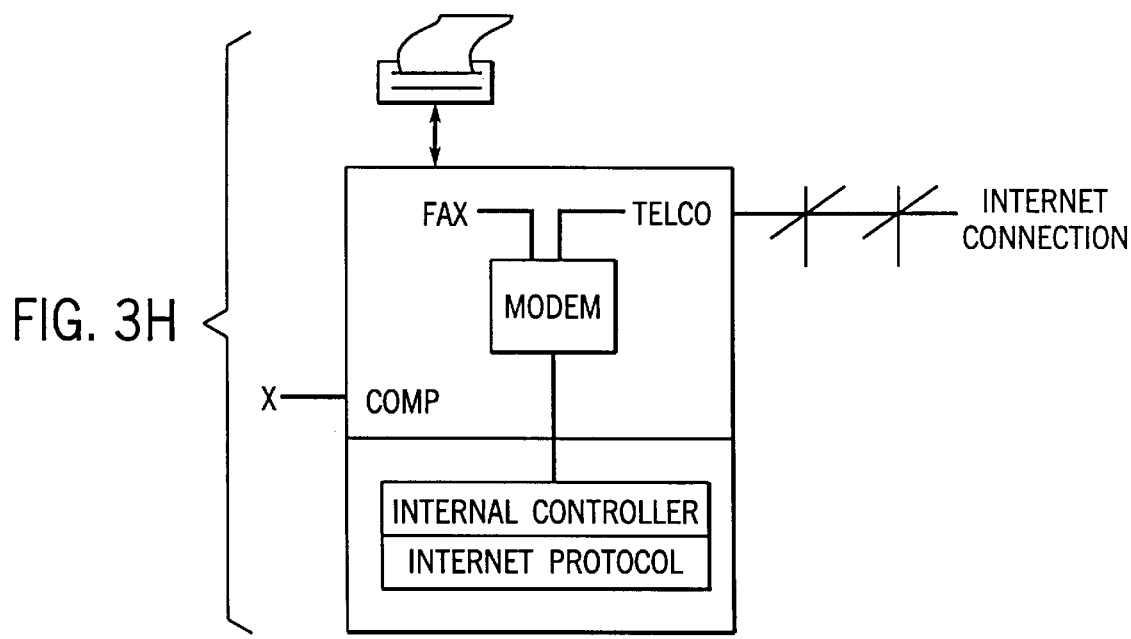
Figure 3I:
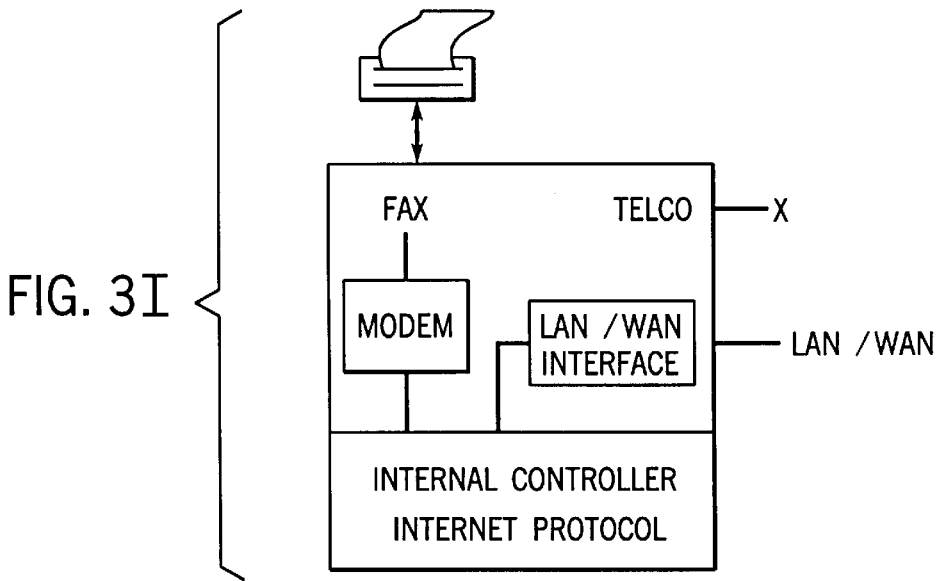
Figure 3J:
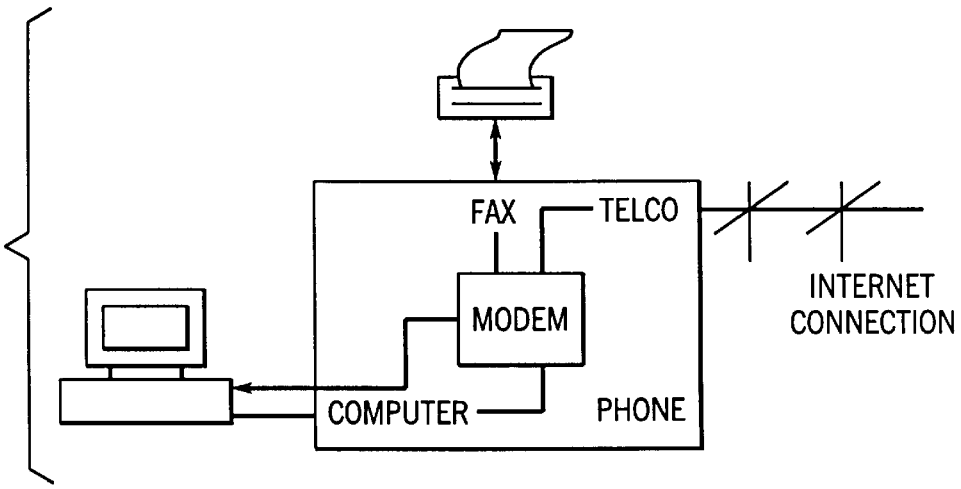
Figure 3K:
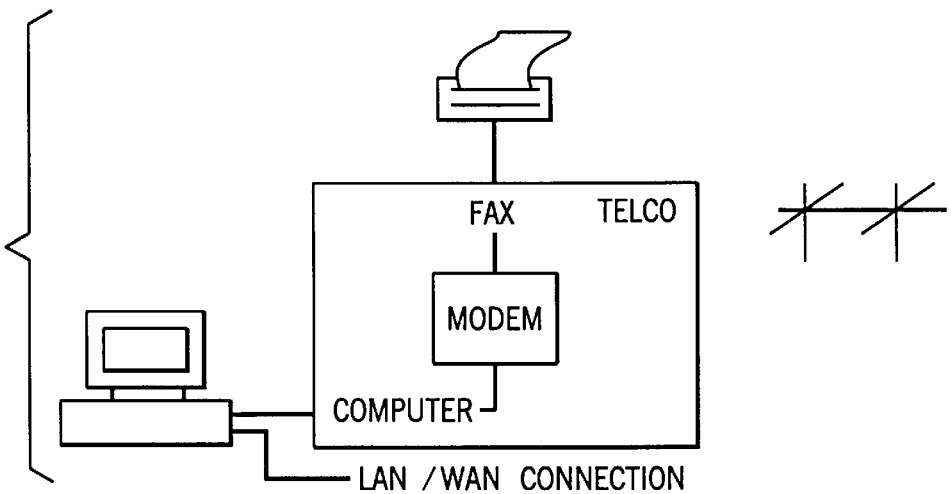
Figure 3L:
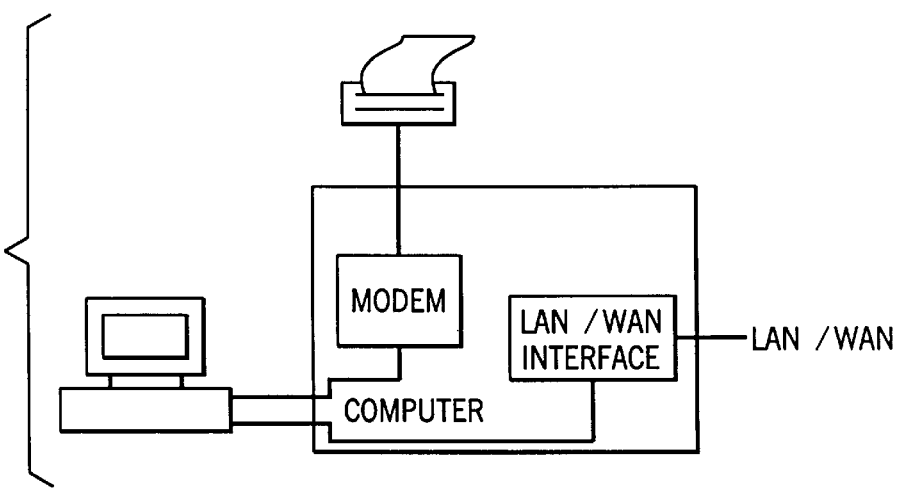
Figure 3M:
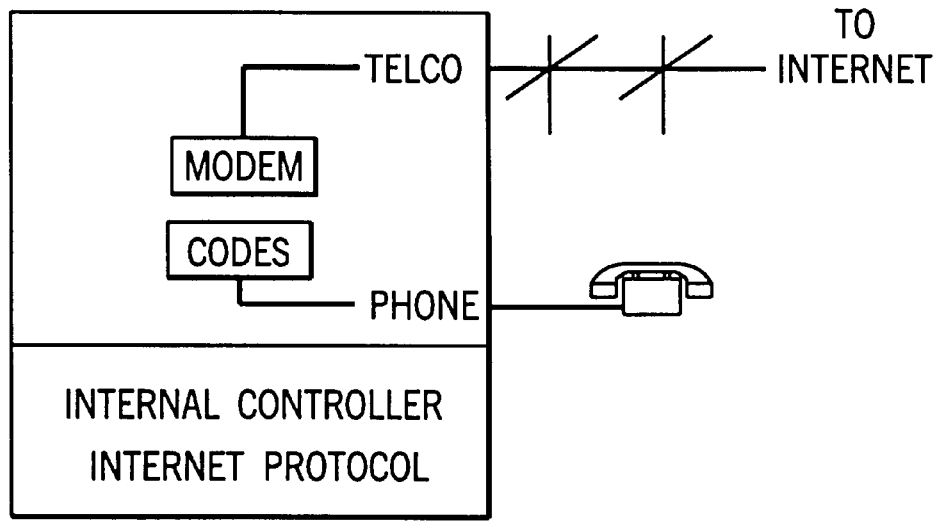
Figure 3N:
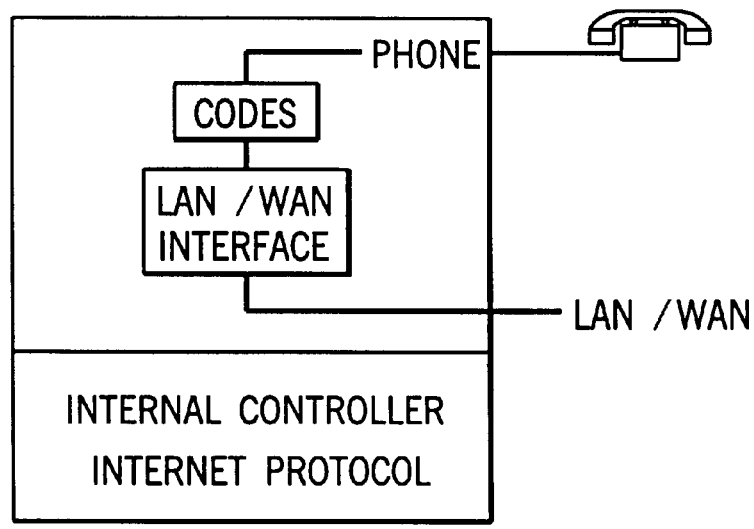
Figure 3:
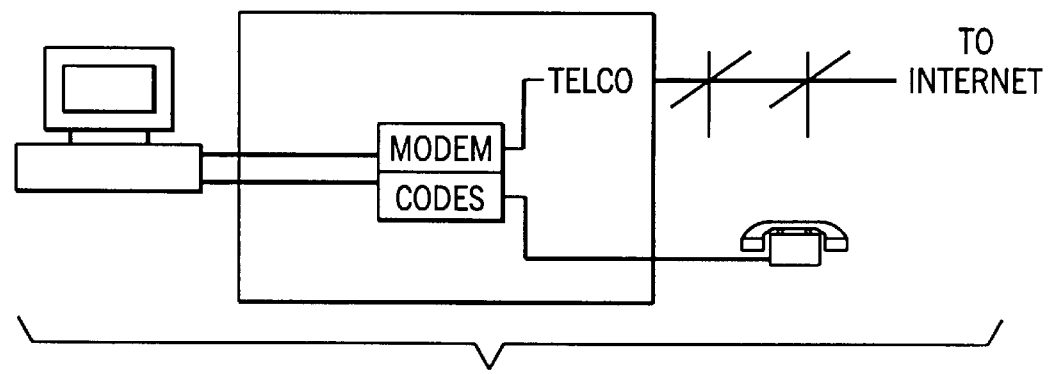
Figure 3P:
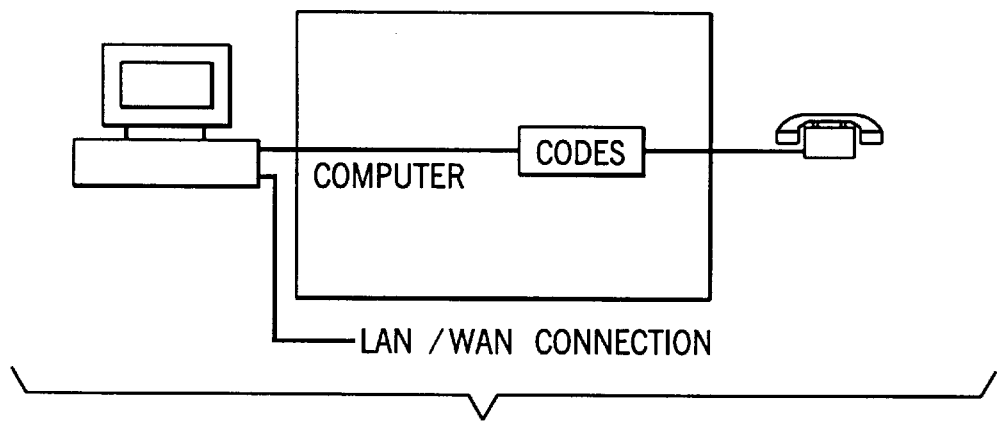
Figure 3Q:
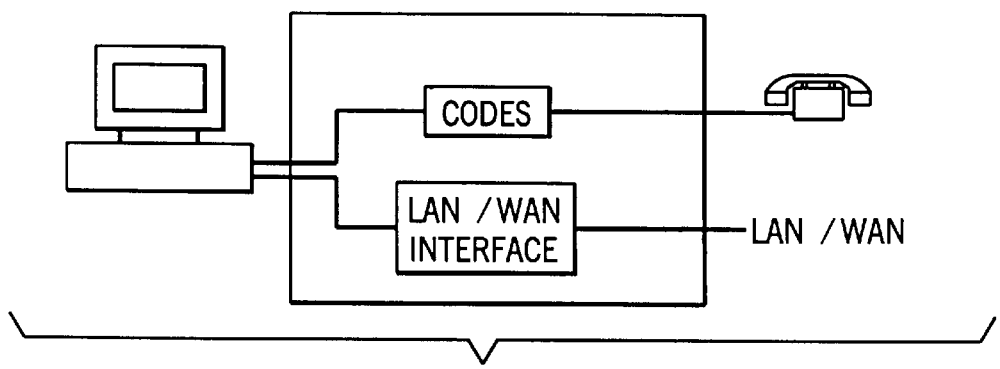

FIGS. 3A–3Q are a diagrammatic views showing various switching combinations made possible by the interface of the subject invention. In the graphically illustrated interface 30 of FIG. 3A, the fax signal transmitted to/from the computer via cable 20 is sent/received directly over any of the following: the telephone line 22, the voice telephone system 24, a hardwired LAN and/or WAN 26 and/or the facsimile machine line 28. FIGS. 3B–3Q illustrate various combinations available utilizing the universal interface of the subject invention.

Figure 4:
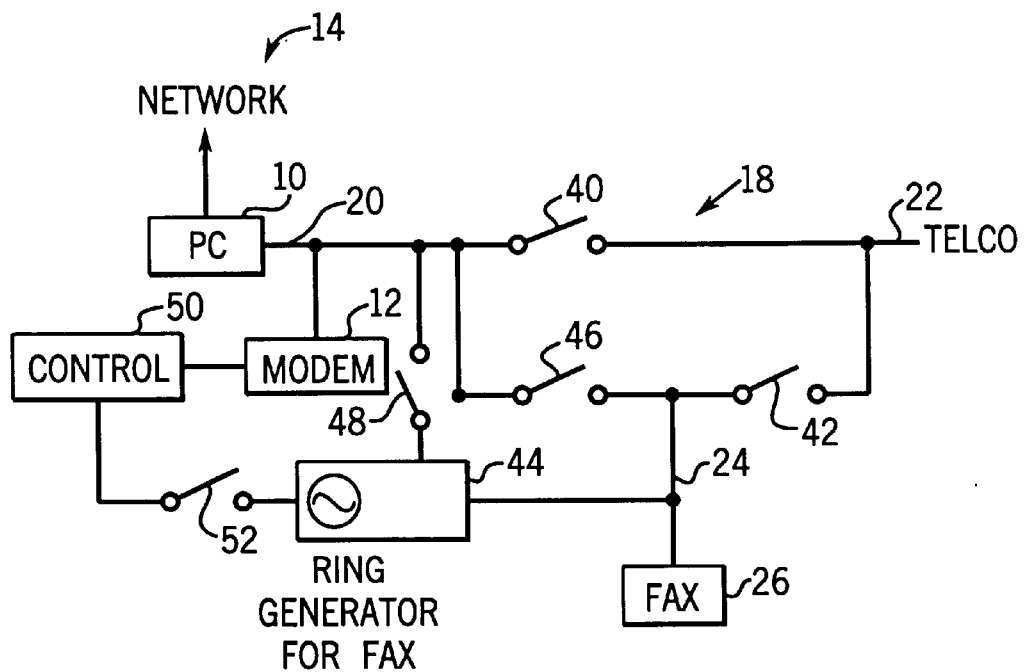
FIG. 4 is a more detailed flow diagram of the interface in accordance with the subject invention.

A more detailed diagram of the interface 18 is shown in FIG. 4. The telephone line 22 is in direct communication with a pair of switches 40, 42, provided in the interface 18. When switch 40 is closed, the telephone line is connected directly to the computer via cable 20. When switch 42 is closed, the telephone line is connected directly to the local facsimile machine via line 24. This line is also connected to a "ring" generator 44 to signal an incoming fax. The ring generator provides am activation signal for initiating the facsimile machine when a standard incoming telephone "ring" signal is not present. The ring generator 44 communicates directly with the computer via cable 20 directly with the local facsimile machine 26 via the interface 26. A parallel switch 48 is also present to selectively initiate the ring generator. Where desired, cable 20 can also be connected directly to the modem and through a controller 50 to a switch 52 and to the ring generator 44 to signal an incoming fax directly from the network.

Figure 5:
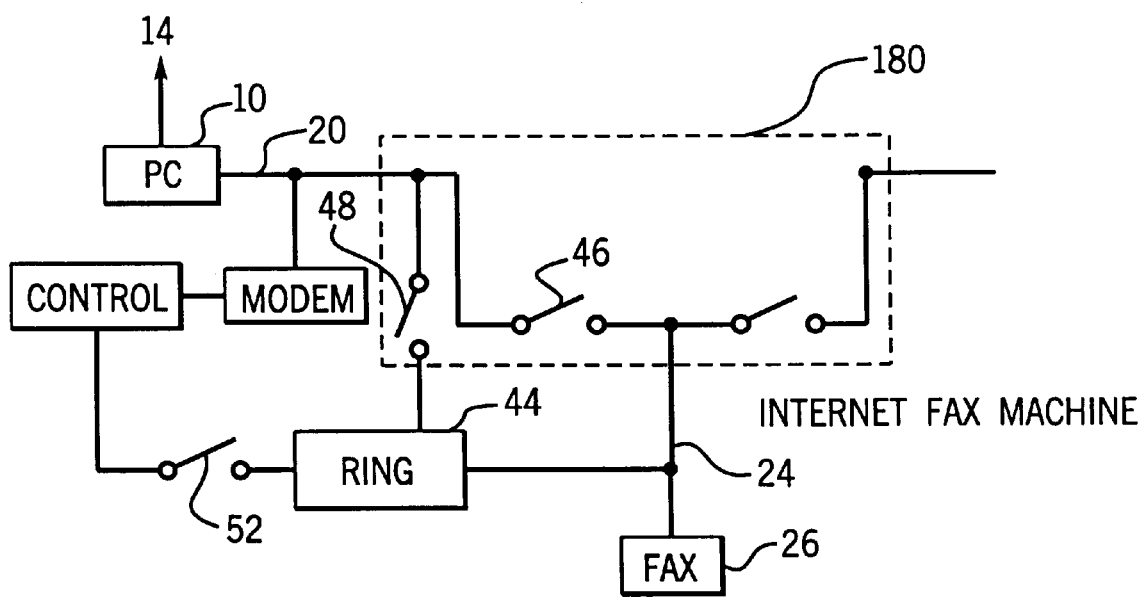
FIG. 5 is an alternative embodiment, similar to FIG. 4.

As more specifically shown in FIG. 5, the system of the present invention is adapted for converting any of a variety of computer generated data signals to a facsimile format, and vise versa. For example, a data signal received by the computer 10 from a network source 14 is output on cable 20 and introduced directly to a local facsimile machine 26 via interface 18. The ring generator 44 will activate the facsimile machine by providing a simulated "ring" signal. Conversely, the local facsimile machine 26 may be used to receive hard copy data and via the interface 18 and dedicated cable 20, introduce the data into the computer 10 for transmission over a network line 14.

The telephone hook-up 22 shown in FIG. 5 is used when a remote facsimile machine is communicating either directly with the facsimile machine 26 in the normal manner, or with the computer 10 for transmission over the selected distributive network.

The facsimile system of the subject invention is very versatile in that it permits the local fax machine 26 to selectively transmit inputted and scanned documents to remote fax systems via telephone line 22, to the computer for processing via cable 20 and to remote fax locations via the Internet 14. The local facsimile machine becomes an inexpensive scanner source for scanning documents directly into the computer. The system of the subject invention also permits documents received via the Internet (whether originating as facsimile transmissions, E-mail or other) or documents generated at the computer or direct facsimile transmissions via telephone line 22 to be printed directly at the local facsimile machine 26, potentially eliminating the need for a separate printer 16.

The facsimile interface and transmission system of the subject invention is an efficient method and apparatus for transmitting and receiving documents via the distributive communication networks such as the Internet as well as via direct computer communication and standard fax transmission, without requiring the use of additional peripheral hardware components. While certain features and embodiments of the invention have been described in detail herein, it will be readily understood that the invention encompasses all modifications and enhancements with the scope and spirit of the following claims.

What is claimed is:

1. A facsimile transmitting/receiving system comprising a standard facsimile machine and a computer based system in communication with the standard facsimile machine for receiving a facsimile signal as generated by the facsimile transmitting/receiving system and converting said facsimile signal for transmission via a computer based distributive network, the system comprising:

a. an interface positioned intermediately of and in communication with both the facsimile machine and the computer, the interface adapted for converting a facsimile signal into a signal suited for transmission over a distributive network;

b. a telephonic-type communication link between the interface and the facsimile machine for receiving and sending facsimile signals for selectively communicating standard facsimile signals directly between the facsimile machine and the interface; and c. an additional communication link between the interface and the computer for receiving and sending converted facsimile signals directly between the interface and the computer; wherein, d. the interface is adapted for converting the facsimile signal into a format compatible for transmission over distributive communication networks and for converting network transmitted signals into a format for transmission over a telephonic facsimile transmission line.

2. The facsimile system of claim 1, the interface further comprising a signal generator for producing a signal whenever a facsimile signal is transmitted to the facsimile machine.

3. The facsimile system of claim 2, wherein said signal generator produces a simulated ring activation signal to simulate a telephone ring whenever a facsimile signal is to be transmitted to the facsimile machine.

4. A method for converting and transmitting a facsimile signal from a local facsimile station to a remote facsimile station via a non-telephonic distributive communication network, comprising the steps of:

a. generating a facsimile signal utilizing a standard facsimile machine at the local facsimile station;

b. converting the facsimile signal to a format compatible with the non-telephonic distributive network;

c. transmitting the converted signal via the non-telephonic distributive network to the remote facsimile station; and d. reconverting the converted signal to a facsimile signal for receipt by the remote facsimile station.

5. The method of claim 4, wherein the generated signal is received at the local station via a telephone line.

6. The method of claim 4, wherein the generated signal is received at the local station via a local facsimile machine.

7. The method of claim 4, wherein the local station includes a telephone transmission line, a local facsimile machine and a network interface and wherein the facsimile signal at the local station can be transmitted/received selectively by any of the telephone transmission line, the local facsimile machine and the network interface.

8. The method of claim 7, wherein the network interface is a personal computer.

9. The method of claim 8, wherein the facsimile signal at the local station may be transmitted directly to the computer for manipulation by additional software support programs.

\* \* \* \* \*